United States Patent [19]

Nishiyama

[11] 4,425,041
[45] Jan. 10, 1984

[54] MEASURING APPARATUS
[75] Inventor: Keizo Nishiyama, Yokohama, Japan
[73] Assignee: Canon Kabushiki Kaisha, Tokyo, Japan
[21] Appl. No.: 283,098
[22] Filed: Jul. 13, 1981

Related U.S. Application Data

[63] Continuation of Ser. No. 969,882, Dec. 15, 1978, abandoned.

[30] Foreign Application Priority Data

Dec. 16, 1977 [JP] Japan ................................ 52-152061

[51] Int. Cl.$^3$ ............................................. G01B 11/30
[52] U.S. Cl. ................................................... 365/371
[58] Field of Search ........................ 356/371, 376, 431
[56] References Cited

U.S. PATENT DOCUMENTS 3,667,846  6/1972  Nater et al. .......................... 356/371
3,700,903 10/1972  Adler et al. ......................... 356/371
3,857,637 12/1974  Obenreder ........................... 356/371
3,866,038  2/1975  Korth .................................. 356/371
3,885,875  5/1975  Rosenfeld et al. .................. 356/371

Primary Examiner—R. A. Rosenberger
Attorney, Agent, or Firm—Fitzpatrick, Cella, Harper & Scinto

[57] ABSTRACT

A measuring apparatus is disclosed in which a surface to be measured is scanned by a scanning beam and the angular deviation of the scanning beam of light regularly reflected from the surface is detected to know the flatness of the surface. The measuring apparatus includes an optical system for projecting the scanning beam obliquely on the surface to increase the amount of the regularly reflected light from the surface so that measurement of the flatness of even such surface containing roughened surface areas or light scattering surface area can be made with the measuring apparatus.

1 Claim, 6 Drawing Figures

MEASURING APPARATUS

This is a continuation of application Ser. No. 969,882, filed Dec. 15, 1978, now abandoned.

BACKGROUND OF THE INVENTION

1. Field of the Invention

The present invention relates to apparatus for measuring the flatness of a surface by scanning the surface with a scanning beam and detecting the angular deviation of the beam of light regularly reflected from the surface.

2. Description of the Prior Art

Various types of flatness measuring apparatus have been known and used. Among them, an interferometer making use of the interference phenomenon of light and an electrostatic capacity type of apparatus making use of 1 change in electrostatic capacity are most widely known. The former is capable of giving two-dimensional information concerning flatness. However, it has a particular disadvantage in that extremely high precision is required for setting the surface to be measured and also that measurement of unevenness and quantative measurements are very difficult to carry out. While the latter mentioned flatness measuring apparatus also allows measurement of the thickness of the subject surface, it has the disadvantage that adjustment of capacity should be made every time the kind of material of the test piece is changed.

In order to eliminate the above described disadvantages, there has been proposed a type of flatness measuring apparatus in which a surface to be measured is scanned by a scanning beam essentially normally incident upon the surface and the angular deviation of the scanning beam of light regularly reflected from the surface is detected in order to determine the flatness of the surface. A typical example of such flatness measuring apparatus is disclosed in U.S. Pat. No. 3,885,875. In the measuring apparatus disclosed therein, the detected angular deviation concerning the inclination of the surface in the direction of scanning, that is, the primary differentiation value of the surface shape relative to scanning time is taken up as the corresponding positional deviation found on a position detecting photoelectric element. An electric integration of the found values gives the value of flatness of the subject surface.

However, this type of flatness measuring apparatus also has the following disadvantage:

When the surface to be measured is a surface on which light is uniformly scattered as in the case of a roughened surface or the like, the measuring apparatus becomes inoperative due to the loss of measuring light. As mentioned above, in the known apparatus, a scanning beam of light is normally incident on the subject surface. Therefore, if the subject surface is a roughened surface having light scattering characteristics, the amount of light regularly reflected from the subject surface toward the collimator lens is reduced to a such extent that no measuring of flatness is possible.

The present invention solves the problem effectively by obliquely projecting a scanning beam on a surface to be measured in a plane normal to the scanning direction so as to decrease the amount of light scattered and instead to increase the amount of light regularly reflected from the surface.

SUMMARY OF THE INVENTION

Accordingly, it is the object of the invention to provide a flatness measuring apparatus of the type in which a surface to be measured is scanned by a scanning beam and the angular deviation of the beam of light regularly reflected from the surface is detected to indicate the flatness of the surface and which can function properly even when the measured surface is a surface having a light scattering property as in the case of a roughened surface.

To attain the above object according to the present invention, there is provided a flatness measuring apparatus comprising an optical system for projecting a scanning beam on a surface to be measured in parallel with the scanning direction and obliquely to the surface as viewed in a plane normal to the scanning direction and an optical system for converting the angular deviation of the beam of light regularly reflected from the surface into the amount of positional deviation on a position detecting photoelectric element.

Other and further objects, features and advantages of the invention will appear more fully from the following description taken in connection with the accompanying drawings.

DESCRIPTION OF THE PREFERRED EMBODIMENTS

Figure 1:
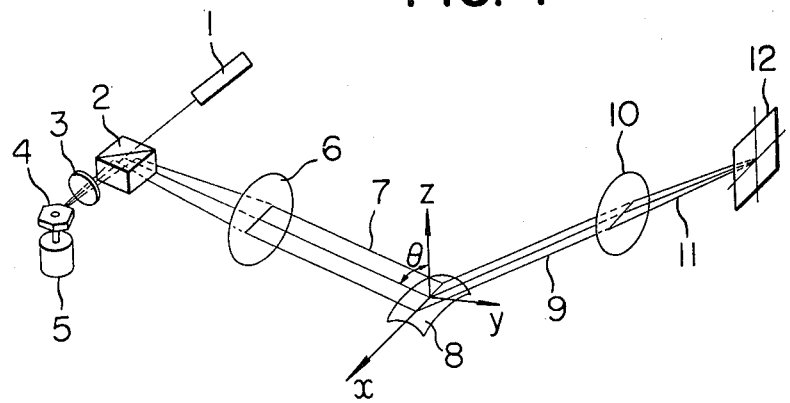
FIG. 1 schematically shows an embodiment of the present invention.

FIG. 1 shows a flatness measuring apparatus in which the present invention is embodied.

In FIG. 1, a laser generator is designated by 1 and a polarization beam splitter by 2. P-polarized light completely passing through the beam splitter 2 enters a quarter wave length plate 3 and after passing through the plate 3, it becomes a circularly polarized light. The light is then incident upon the respective reflecting surface of a polygon mirror 4 which is rotated by a motor 5 at a certain constant speed. The beam of light reflected by the polygon mirror 4 and diverging from the reflection point enters again the quarter wave length plate 3 and leaves the plate 3 as S-polarized light toward the polarization beam splitter 2. The S-polarized light is totally reflected by the beam splitter 2 and incident upon a collimator lens 6 at the focal point of which the polygon mirror 4 is located. The beam of light 7 emerging from the collimator lens 6 forms a parallel beam of light for scanning a surface 8 to be measured in a rectilinear direction. The scanning beam is incident on the subject surface 8 obliquely in a plane normal to the scanning direction.

To make the scanning beam 7 incident on the subject surface 8 obliquely is the most important feature of the invention. This feature is effective to reduce the solid angle of scattered light on the surface and to increase the quantity of light regularly reflected from the surface.

Figure 2:
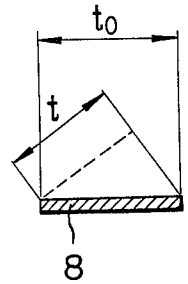
FIG. 2 is an explanatory view of a scanning beam incident upon the subject surface obliquely within a plane containing the scanning direction.

As will be understood from the illustration of FIG. 2, when the scanning beam is incident on the subject surface 8 obliquely in a plane containing the scanning direction, the time required for completion of scanning varies depending upon the angle of incidence ($t < t_0$). On the contrary, when the scanning beam is incident on the subject surface 8 obliquely in a plane normal to the scanning direction, the time remains always constant even when the angle of incident varies.

The beam of light 9 reflected from the subject surface 8 enters a second collimator lens 10 which focuses it on the light receiving surface 12 of a position detecting photoelectric element disposed at the focal point of the second collimator lens. The position at which the focussing beam 11 is incident on the light receiving surface corresponds to the inclination of the subject surface relative to the scanning beam 7. Therefore, the incident position of the beam 11 on the position detecting photoelectric element gives the measure of flatness of the subject surface.

By making the scanning beam incident upon the subject surface obliquely in accordance with the invention, the range within which flatness can be measured, is broadened as described hereinafter.

Figure 3:
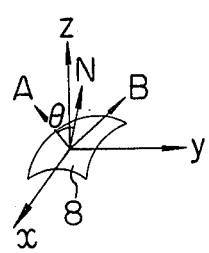
FIG. 3 illustrates the relation between the incident light on and the reflected light from the subject surface.

A system of coordinates is plotted with its X-axis extending in the scanning direction, Z-axis in the direction of optical axis at the time of normal incidence and Y-axis extending normally to X and Y axes and it is assumed that a beam of light is incident on the subject surface 8 obliquely at an angle of $\theta$ in a plane extending normally to X-axis as shown in FIG. 3. Let A denote the inverse incidence unit vector, N the unit vector of normal to the surface and B the reflection unit vector. Then, $$A\,(0,\,-\sin\theta,\,\cos\theta)$$
$$N\,(n_x,\,n_y,\,n_z)$$
$$B\,(b_x,\,b_y,\,b_z)$$

According to the law of reflection, A, N and B have the following relation:

$$B = (2A\cdot N)N - A$$

Using this equation, there is given:

$$b_x = -2n_x n_y \sin\theta + 2n_x n_z \cos\theta$$

$$b_y = -2n_y^2 \sin\theta + 2n_y n_z \cos\theta + \sin\theta$$

$$b_z + -2n_y n_z \sin\theta + 2n_z^2 \cos\theta - \cos\theta$$

The unit vector of reflected light toward the center of the light receiving surface 12 of the position detecting photoelectric element, that is, the unit vector $B_0$ (the subject surface is to be a plane normal to Z-axis) is:

$B_0(0,\,\sin\theta,\,\cos\theta)$ since $n_x = 0$, $n_y = 0$, $n_z = 1$.

Figure 4:
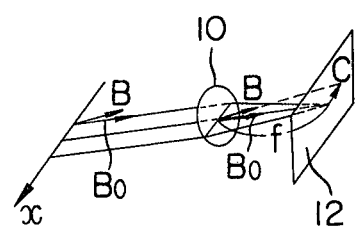
FIG. 4 illustrates the beam of light reflected from the subject surface.
Figure 5:
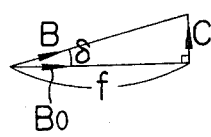
FIG. 5 is an explanatory view of the beam of light incident upon the position detecting photoelectric element.

In FIG. 4, it is assumed that the vector of deviation from the center of the light receiving surface 12 of the photoelectric position detector is C ($c_x$, c $c_y$, $c_z$) and the focal length of the focusing lens 10 is f. Then, from FIG. 5.

$$C = \frac{f}{B\cdot B_0} B - fB_0$$

$$\begin{cases} c_x = \dfrac{f(-2n_x n_y \sin\theta + 2n_x n_z \cos\theta)}{(2n_z^2 - 1)\cos^2\theta - (2n_y^2 - 1)\sin^2\theta} \\[1ex] c_y = \dfrac{f(2n_x^2 \sin\theta \cos\theta + 2n_y n_z \cos\theta)}{(2n_z^2 - 1)\cos^2\theta - (2n_y^2 - 1)\sin^2\theta} \\[1ex] c_z = \dfrac{f(-2n_x^2 \sin^2\theta \cos\theta - 2n_y n_z \sin\theta)}{(2n_z^2 - 1)\cos^2\theta - (2n_y^2 - 1)\sin^2\theta} \end{cases}$$

Figure 6:
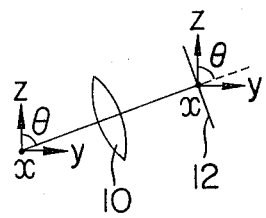
FIG. 6 illustrates the manner of obtaining the positional deviation of the beam on the position detecting photoelectric element.

Let $D_x$ denote the component in the scanning direction on the light receiving surface 12 and $\tilde{D}_x$ the component in the direction normal to the scanning direction. Then, from FIG. 6, $$\begin{cases} D_x = c_x \\ \tilde{D}_x = c_z\sin\theta - c_y\cos\theta \end{cases}$$

$B\cdot B_0 = (2n_z^2 - 1)\cos^2\theta - (2n_y^2 - 1)\sin^2\theta.$

This gives:

$$\begin{cases} D_x = \dfrac{f(-2n_x n_y \sin\theta) + 2n_x n_z \cos\theta)}{(2n_z^2 - 1)\cos^2\theta - (2n_y^2 - 1)\sin^2\theta} \\[1ex] \tilde{D}_x = \dfrac{f(-2n_x^2 \sin\theta \cos\theta - 2n_y n_z)}{(2n_z^2 - 1)\cos^2\theta - (2n_y^2 - 1)\sin^2\theta} \end{cases}$$

For a measured surface of $n_y \approx 0$ and $n_z \approx 1$, $$\begin{cases} D_x \approx 2fn_x\cos\theta \\ \tilde{D}_x \approx -2fn_y. \end{cases}$$

Using this, $D_x$ can be detected even by a unidimensional sensor.

The component $n_x$ of the inclination of the subject surface in the scanning direction is given by $n_x \approx D_x / 2f\cos\theta$ By using the larger angle of $\theta$, the solid angle of reflected light from the subject surface is narrowed to the larger extent so that the accuracy of measurement according to the invention using the reflected light may be improved.

Generally, a wafer, especially a wafer in a state of rough surface before its being processed to a mirrored surface wafer has a large value of camber. In measuring the flatness of such roughened surface, it is required to use a large oblique incident angle $\theta$ so as to increase the quantity of reflected light from the surface. The present invention permits measurement of the flatness of such roughened surface in a manner of non-contact measuring method and with a higher speed. If desired, two-dimensional information of the flatness may be obtained by moving the subject surface rotationally or translationally while maintaining the angle of incidence on the subject surface unchanged.

While the invention has been particularly shown and described with reference to preferred embodiments thereof, it will be understood by those skilled in the art that the foregoing and other changes in form and details can be made therein without departing from the spirit and scope of the invention.

What I claim is:

1. A flatness measuring apparatus for measuring a one dimensional profile of a roughened surface by detecting the absolute angular deviation of regularly reflected light beams from said surface in a scanning direction on a position detecting photoelectric element and making an electric integration of the output of said photoelectric element, comprising:

means for generating a light beam;

optical means for scanning the light beam across the roughened surface along a scanning line;

a first collimator lens provided between said optical means and the roughened surface for collimating the light beam, said first collimator lens being positioned such that for any point along the scanning line, the collimated beam is projected to the scanning line in a plane normal to the scanning line and at an oblique angle to the normal of the roughened surface, thereby increasing the amount of light reflected from the roughened surface, a second collimator lens to concentrate the light reflected from the roughened surface; and a photoelectric element positioned at the focal plane of said second collimator lens for detecting the deviation component in the direction of the scanning line.

* * * * *

UNITED STATES PATENT AND TRADEMARK OFFICE
CERTIFICATE OF CORRECTION

PATENT NO. : 4,425,041
DATED : January 10, 1984
INVENTOR(S) : KEIZO NISHIYAMA

It is certified that error appears in the above-identified patent and that said Letters Patent is hereby corrected as shown below:

Column 4

Line 18, change "$D_x$" to --$\tilde{D}_x$--.

Signed and Sealed this

First Day of May 1984

[SEAL]

Attest:

GERALD J. MOSSINGHOFF

Attesting Officer

Commissioner of Patents and Trademarks